United States Patent [19]

Smith

[11] Patent Number: 5,602,447
[45] Date of Patent: Feb. 11, 1997

[54] CATHODE RAY TUBE FOCUS SUPPLY

[75] Inventor: Lawrence E. Smith, Noblesville, Ind.

[73] Assignee: Thomson Consumer Electronics, Inc., Indianapolis, Ind.

[21] Appl. No.: 285,329

[22] Filed: Aug. 3, 1994

[51] Int. Cl.$^6$ .............................. H01J 29/70; G09G 1/04
[52] U.S. Cl. ............................................ 315/411; 315/382
[58] Field of Search ..................................... 315/411, 382

[56] References Cited

U.S. PATENT DOCUMENTS 4,611,152  9/1986  Hishiki et al. ........................... 315/411

*Primary Examiner*—Gregory C. Issing
*Attorney, Agent, or Firm*—Joseph S. Tripoli; Joseph J. Laks; Harvey D. Fried

[57] ABSTRACT

A focus supply circuit, comprising: a power source for generating a high voltage for energizing a cathode ray tube, including a transformer having a high voltage winding with at least one intermediate output tap; and, a focus screen assembly, having a resistive chain with an input terminal coupled for receiving the high voltage, a focus output terminal for energizing a focus electrode of the cathode ray tube and at least one intermediate input tap between the input terminal and the focus output terminal, coupled to the at least one intermediate tap of the high voltage winding by an independent conduction path. An effective bias current for the cathode ray tube flows in the resistive chain. The voltages at the intermediate taps correspond to one another within a tolerance. The conductive path presents sufficiently low impedance to substantially inhibit variation of the high voltage due to variation of leakage current from the focus electrode.

1 Claim, 4 Drawing Sheets

CATHODE RAY TUBE FOCUS SUPPLY

BACKGROUND OF THE INVENTION

This invention relates to the field of developing focus supply voltages for cathode ray tubes in televisions and the like.

A high voltage power supply, for example in a television receiver, generates a high voltage from the high voltage winding in a flyback transformer, sometimes constructed as an integrated high voltage transformer (IHVT). The voltage is boosted by a series of windings and diodes. The high voltage (HV), sometimes referred to as EHT (extra high tension) may be approximately 30 KV or higher, depending on the size of the cathode ray tube. Some receivers with larger tubes utilize high voltage boosters having a second transformer, a second horizontal output stage and a second high voltage winding. The horizontal focus voltage supply in a television receiver may be in the range of approximately one fifth (⅕) to one third (⅓) of the EHT. Focus voltage and screen voltage can therefore be derived from the EHT.

A focus screen assembly is usually provided for generating the focus and screen voltages. The focus screen assembly, which is energized by the high voltage winding of the IHVT, includes a network of fixed resistors, variable resistors and capacitors. The assembly will generate horizontal focus voltage, also referred to as Focus 1 voltage, screen voltage and vertical focus voltage, also referred to as Focus 2 voltage. The component resistors of the assembly are deposited on a ceramic substrate and the assembly is fully enclosed and insulated. Means for adjusting the variable resistors to set the focus and screen voltage levels are accessible from outside the case. The assembly is coupled to the high voltage output of the IHVT, also referred to as the flyback transformer. The assembly utilizes a resistor chain to supply the focus and screen voltages at levels below the high voltage level.

There are two approaches known for energizing a focus screen assembly, and appropriate focus screen assemblies are manufactured for each of these approaches. One approach is generally referred to as the resistor divider network approach. The other approach is generally referred to as the peak detected approach, although a resistor chain is also utilized in the focus screen assembly. The approaches differ in the point of the high voltage winding from which energy is coupled to the focus screen assembly.

The resistor divider network approach, such as shown in FIG. 1, energizes the focus screen assembly with the full value of the EHT, as supplied to the cathode ray tube. This approach tends to provide a rather large source impedance for the focus supply, for example approximately 170 MOhm, which can become a problem for focus leakage currents. Focus leakage currents can be caused by imperfections, impurities and gas particles in the tube. It will be appreciated that a leakage current of only 70 μamp, for example, will cause a large voltage drop against an impedance of 170 MOhm. One might try to reduce the source impedance of the resistive divider, but two problems in particular are encountered. Firstly, reducing the source impedance results in a higher current density, which requires a larger ceramic substrate area to handle the additional heat dissipation. This adds to the expense of the assembly. Secondly, it is costly in general to generate the high voltage in the first place. Energy loss through such heat dissipation is inefficient and costly, in and of itself. On the other hand, the resistive divider desirably provides a small bias current for the high voltage supply even when the cathode ray tube is not conducting. High voltage supply changes at low beam current levels are therefore reduced. As a consequence, raster size changes resulting from changes in beam current are minimized.

The peak detected approach, such as shown in FIG. 2, energizes the focus screen assembly from a tap of the high voltage winding of the IHVT. The voltage at the tap should be greater than the required focus voltage, so that an adjustment range is available. A one third (⅓) tap, that is, a voltage level equal to approximately one-third (⅓) of EHT, can be appropriate. This approach has the advantage of providing a lower source impedance, but disadvantageously, does not provide much preloading, in the form of a bias current for the high voltage supply. As a consequence, raster size changes resulting form changes in beam current are more likely.

The problem, then, is to provide a supply voltage for the focus screen assembly from a low impedance source, which minimizes voltage loss and dissipation, and at the same time, provide an adequate bias voltage for the high voltage supply, even when the cathode ray tube is not conducting.

SUMMARY OF THE INVENTION

The problem can be solved in accordance with an inventive arrangement which combines the resistive divider approach and the peak detected approach. In a new approach, the resistor divider network is modified by connecting the tap on the IHVT, for example the one third (⅓) tap, to a tap of the same voltage as generated by the resistor chain in the focus screen assembly, for example, one third (⅓) of the EHT voltage. The source impedance is lower, resulting in higher efficiency and lower losses, thus securing the advantages of the peak detected approach. Moreover, an adequate bias current is provided for the high voltage supply even when the cathode ray tube is not conducting, thus securing the advantage of the resistive divider approach by minimizing raster size changes due to beam current variation.

There is a concern regarding the consequences of not perfectly matching the voltage levels of the taps on the high voltage winding of the IHVT and the resistor chain respectively, for example, tapping 33⅓% of the high voltage winding and tapping 35% of the voltage on the resistor chain. Such precise matching is not necessary, although close matching is desirable for maximum efficiency. There is a range of tolerance in the disparity between the tapped voltage levels in which the advantages of the inventive arrangement are fully realized. If the tap of the high voltage winding, for example, is 33⅓%, the tap voltage of the resistor chain can be in the range of approximately ±5% around the IHVT tap value with reasonably good results at the extremes.

A circuit in accordance with an inventive arrangement comprises: means for generating a high voltage for energizing a cathode ray tube, including a transformer having a high voltage winding with at least one intermediate output tap; and, a resistive chain with an input terminal coupled for receiving said high voltage, a focus output terminal for energizing a focus electrode of said cathode ray tube and at least one intermediate input tap between said input terminal and said focus output terminal, coupled to said at least one intermediate tap of said high voltage winding by an independent conduction path. The resistive chain may be embodied in a focus screen assembly.

DETAILED DESCRIPTION OF THE PREFERRED EMBODIMENTS

Figure 1:
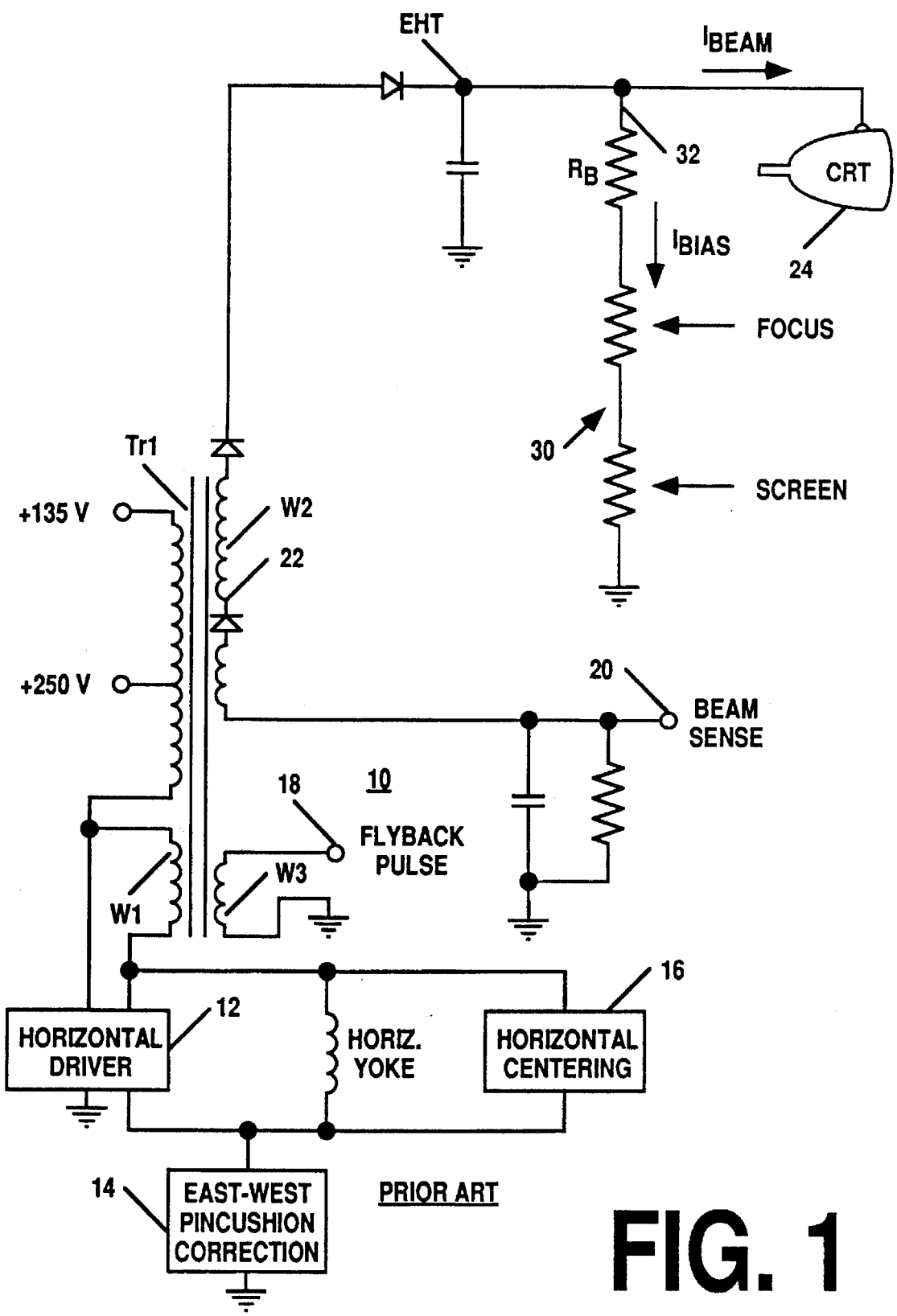
FIG. 1 is schematic diagram of a resistive divider circuit, according to the prior art, for generating focus voltage.

FIG. 1 is a schematic diagram of a focus supply circuit embodying the prior art resistive divider network approach. Means 10 for generating a high voltage comprises a flyback transformer Tr1, having a primary winding W1 coupled to a horizontal driver circuit 12 and a horizontal deflection yoke. An East-West pincushion correction circuit 14 and horizontal centering circuit 16 are also included. A high voltage secondary winding W2 is used to generate a high voltage, or EHT, having a value of 30 KV, for example. The other end of the winding is coupled to a circuit which generates a beam sense signal for monitoring the beam current $I_{BEAM}$ level delivered to the cathode ray tube (CRT) 24. Another secondary winding W3 is a source of horizontal flyback pulses. Secondary winding W2 has an intermediate tap 22 identified, which is not used in the embodiment of FIG. 1. The operation of means 10 is known in the art.

Focus voltage and screen voltage for the cathode ray tube 24 are generated by a resistive chain 30, having an input terminal 32. The resistive chain 30 is coupled between the EHT voltage and ground. The resistive chain 30 is illustrated as three resistors; a fixed bias resistor $R_B$ and variable resistors for setting each of the focus and screen voltages. When the resistive chain is itself embodied in a focus screen assembly, there are actually many more resistors than three. Resistor $R_B$ has a resistance of approximately 350M Ohm and the resistance of the entire chain is approximately 500M Ohm. This approach results in a useful bias current $I_{BIAS}$, but exhibits a source impedance which is too high.

Figure 2:
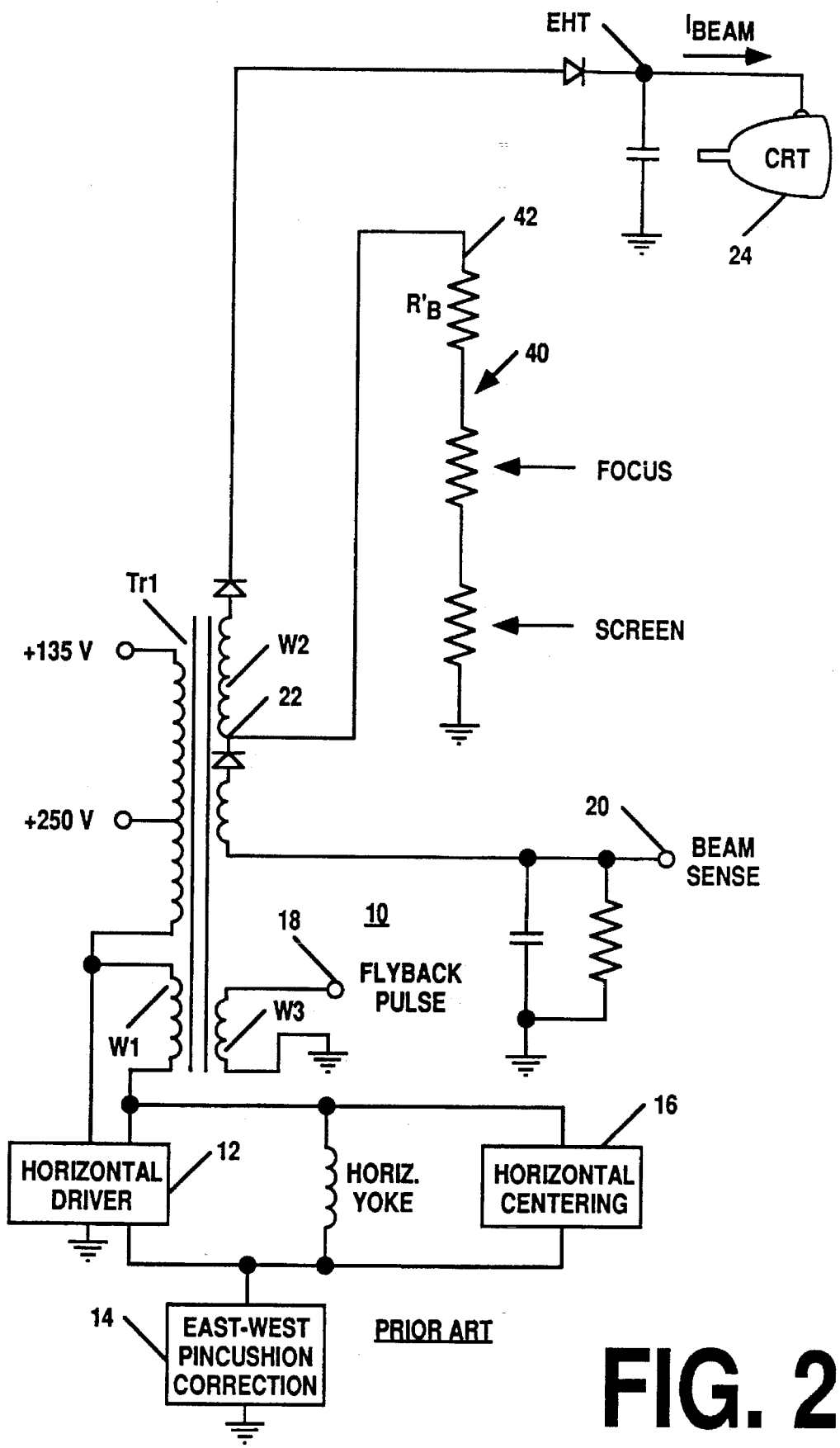
FIG. 2 is a schematic diagram of a peak detected circuit, according to the prior art, for generating focus voltage.

FIG. 2 is a schematic diagram of a focus supply circuit embodying the prior art peak detected approach. Means 10 for generating a high voltage is the same as explained in connection with FIG. 1. In FIG. 2, a resistive chain 40 is coupled, through an input terminal 42, between the intermediate tap 22 of the winding W2 and ground. Resistive chain 40 is also illustrated as three resistors for purposes of simplicity. If tap 22 represents approximately one third (⅓) of a high voltage of 30 KV, for example, then a much smaller voltage drop is needed in the resistive divider to develop the focus and screen voltages than is the case in the circuit of FIG. 1. Accordingly, the resistance of resistor $R'_B$ and the resistance of the entire chain 40 will also be lower than in resistive chain 30. This provides a lower source impedance, but a negligible bias current, which is not shown for that reason.

Figure 3:
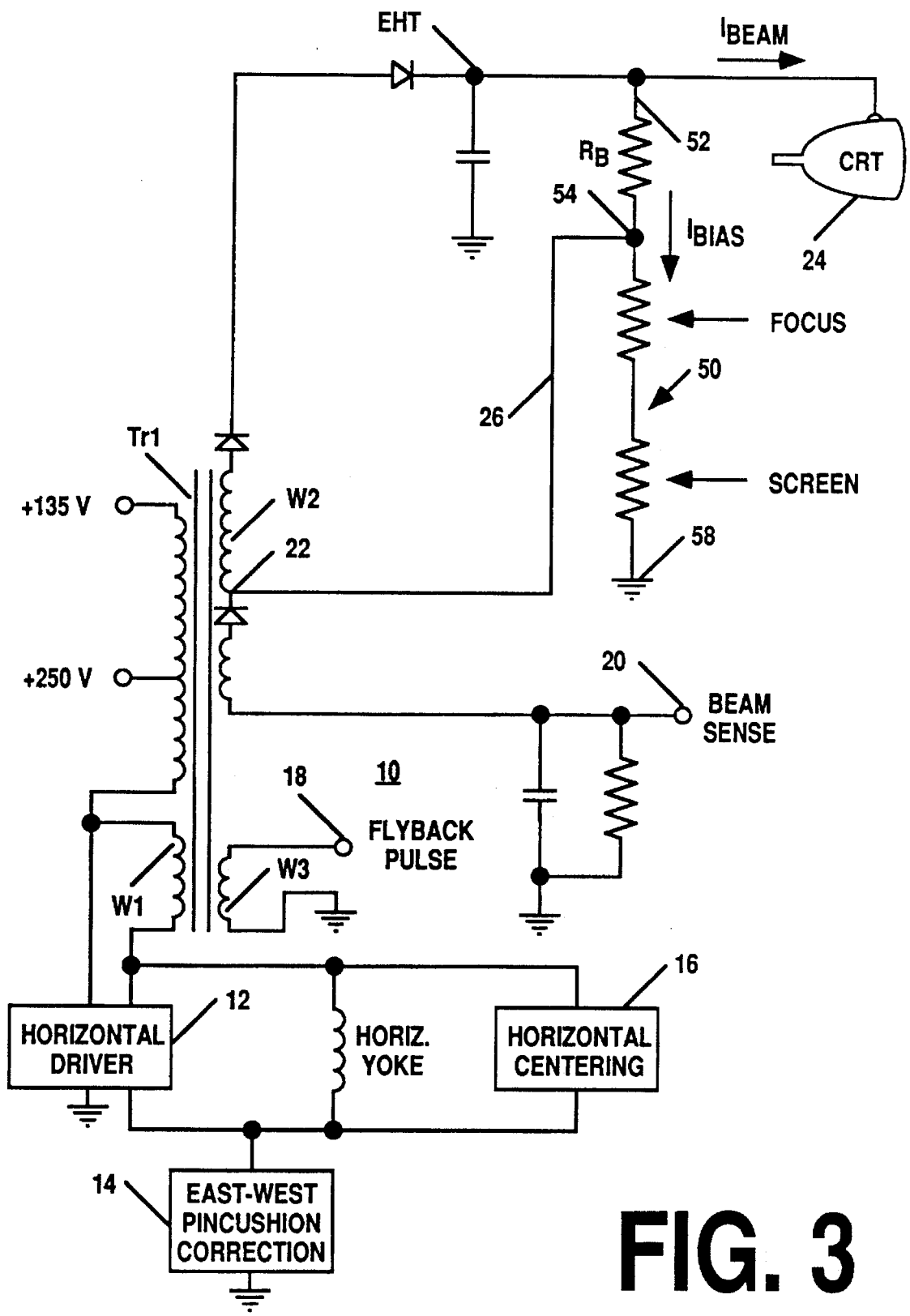
FIG. 3 is a schematic diagram of a circuit for generating focus voltage according to an inventive arrangement.

FIG. 3 is a schematic diagram of a focus supply circuit according to an inventive arrangement. Means 10 for generating a high voltage is the same as explained in connection with FIG. 1. A resistive chain 50 has an input terminal 52, and is coupled between the EHT voltage and a ground 58. The ground of the resistive chain is denoted by a reference numeral for purposes of identifying resistive chain 50 in FIG. 4, explained below. The resistive chain 50 also has a bias resistor RB having a value of approximately 350M Ohm and the entire chain has a resistance of approximately 500M Ohm.

Figure 4:
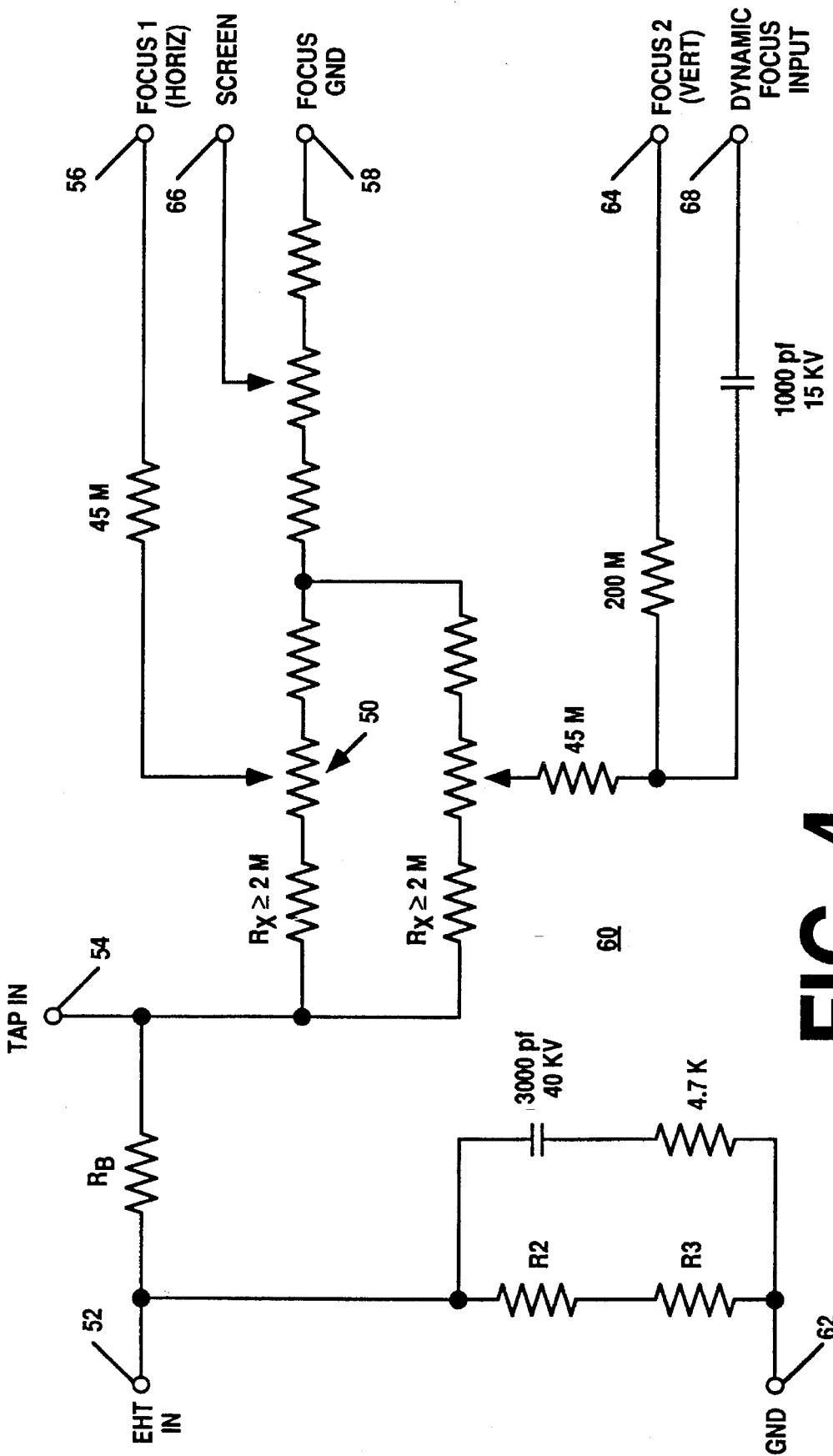
FIG. 4 is a schematic diagram of a focus screen assembly which can be used in the circuit of FIG. 3.

The circuit of FIG. 4 also has an independent conductive path 26 between the tap 22 of winding W2 and an intermediate tap 54 of the resistive chain 50. The resulting topography represents a synergistic combination of the prior art approaches which, for the first time, provides a low source impedance and an adequate bias current $I_{BIAS}$. It is preferable that the intermediate taps 22 and 54 be chosen so as to connect substantially equal voltage levels to one another. In the illustrated embodiment, each intermediate tap is approximately a one third (⅓) tap, representing approximately 10 KV. It appears that differences between the intermediate tap voltages in a range of approximately ±5% of the EHT can be tolerated without significantly compromising the advantages of the inventive arrangement. Moreover, the low source impedance is achieved without increasing current density and substrate area in a focus screen assembly, as shown in FIG. 4.

With reference to FIG. 4, the resistive chain 50 forms an integral part of a focus screen assembly 60, in which the resistors are formed by deposition on a ceramic substrate. Resistive chain 50 begins at input terminal 52, which is coupled to the EHT voltage. The other end of resistor chain 50 is coupled to focus ground at terminal 58. Resistor $R_B$ is shown, as are variable resistors for adjusting the focus voltages and screen voltage are also shown. The Focus 1 (horizontal) voltage is an output on terminal 56. The Focus 2 (vertical) voltage is an output on terminal 64. The Screen voltage is an output on terminal 66. Terminal 68 is an input for a dynamic focus correction signal. Focus screen assembly 60 differs from prior art focus screen assemblies in the provision of intermediate tap input 54, which is coupled between one terminal of resistor $R_B$ and the junction of resistors $R_X$.

The present specifications for the focus screen assembly 60 as it will be used in the CTC-189 chassis manufactured by Thomson Consumer Electronics, Inc., which are not already shown on the drawing, are as follows:

| | |
|---|---|
| Operating Voltage (EHT) | 30.0 KV–34.5 KV; |
| Maximum DC Voltage | 35.5 KV; |
| Resistance Total EHT IN to Terminal 62 | 290 M Ohm ± 20%; |
| Resistance Focus Total | 500 M Ohm Nominal; |
| Resistance Bleeder Total (R2 + R3) | 700 M Ohm Nominal; |
| Focus 1 + Focus 2 Maximum ≧ | 33% of EHT; |
| Focus 1 + Focus 2 Minimum ≦ | 28% of EHT; |
| Screen Maximum ≧ | 485 V; |
| Screen Minimum ≦ | 135 V; and, |
| IHVT Tap Voltage Range | 35%–37% of EHT. |

What is claimed is:

1. A circuit, comprising:

a high voltage transformer;

a horizontal deflection circuit coupled to a primary winding of said transformer, said horizontal deflection circuit causing flyback pulses in secondary windings of said transformer;

a plurality of diodes and said secondary windings coupled alternately in a series arrangement of voltage boosting stages, said series arrangement having a high voltage output terminal for energizing a cathode ray tube;

a resistive chain having an input terminal coupled to said high voltage output terminal, having a focus output terminal for energizing a focus electrode of said cathode ray tube and having at least one intermediate tap between said input terminal and said focus output terminal; and, said series arrangement having at least one intermediate tap coupled to said intermediate tap of said resistive chain by an independent conduction path, each of said intermediate taps having a voltage level, established independently of said conduction path, corresponding approximately to a voltage level of said focus output terminal±approximately five percent (5%) of said high voltage.

* * * * *